Patented Apr. 20, 1937

2,077,745

UNITED STATES PATENT OFFICE 2,077,745

PROCESS FOR BREAKING PETROLEUM EMULSIONS

Melvin De Groote, St. Louis, Mo., assignor to Tretolite Company, Webster Groves, Mo., a corporation of Missouri No Drawing. Application August 21, 1936, Serial No. 97,223

14 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by my process consists of a sulfo polyhydric alcohol ester of a detergent-forming carboxy acid.

It has long been known that various acids combine with alkalis to produce soap or detergent-like materials. Such acids include the higher fatty acids derived from animal or vegetable sources, such as oleic acid, stearic acid, palmitic acid, ricinoleic acid, etc. Acids derived from rosins such as abietic acid represent another class. Similarly, carboxy acids derived from petroleum, such as various naphthenic acids, represent another class. It is also well known that these various detergent-forming acids can be modified so as to produce equivalent derivatives, which have the same functional properties. For instance, chlorinated or brominated oleic acid produces detergent-like materials, and such acid is classified as detergent-forming acid. Similarly, fatty sulfonic acids, fatty acid sulfates, or sulfo-aromatic fatty acids represent detergent-forming carboxy acids which combine with alkalis to produce detergents or detergent-like materials. Similarly, hydrogenated abietic acid or sulfonated abietic acid will serve as satisfactorily for the formation of a detergent as abietic acid itself, and such functional derivatives are considered as detergent-forming acids.

If the detergent acid of the kind previously described be indicated by the formula RCOOH, and if such acid be combined with a polyhydric alcohol indicated by the formula $T(OH)_n$; where $n$ represents the numeral 2 or more, one can produce by esterification a product indicated by the formula $R''.COO.T(OH)_{n-1}$. If such product be sulfonated so that a residual polyhydric alcohol is removed, with the formation of an acid sulfate, one may obtain a material of the formula type $R''.COO.T.SO_4H.(OH)_{n-2}$. This material may be converted into a salt such as the sodium salt indicated by the following type formula:

$$R''.COO.T.SO_4.Na.(OH)_{n-2'}.$$

I have found that materials exemplified by this type formula, and particularly, isologues of this formula, are very effective demulsifying agents for breaking oil field emulsions. It is understood that I am concerned with the application of such materials as demulsifying agents for petroleum emulsions, without limitation as to the particular method employed to produce or obtain such materials. In most instances, these materials can be made by more than one process, and it is immaterial which particular process or method is employed. In a general manner, the methods employed may be divided into two classes. One method contemplates combining the carboxylic acid with the polyhydric alcohol body and then sulfonating the ester obtained. Another method contemplates combining the sulfuric acid with the polyhydric alcohol so as to produce a material such as sulfurin, di-sulfurin or tri-sulfurin, and then combining the sulfo glycerol body or its equivalent with the acid or a suitable derivative thereof.

If one has available a mono-glyceride or a di-glyceride, such material may be treated in a manner so as to sulfate the remaining polyhydric hydroxyl or hydroxyls. Mono-stearin, for example, may be treated with a suitable sulfonating agent, such as gaseous sulfur trioxide to produce a mono-sulfo or a di-sulfo glycerol ester. Instead of gaseous sulfur trioxide, one may employ chlorsulfonic acid, etc.

Mono-glycerides or di-glycerides can be made in various ways. The carboxy acid may be mixed with an equivalent quantity of glycerol and esterified in presence of dry hydrochloric acid gas. Glycerol can be converted into a halohydrin, such as the chlorhydrin, and the chlorhydrin can be reacted with the carboxylic acid with the evolution of hydrochloric acid gas. Similarly, glycerol chlorhydrin can be reacted with a sodium salt, such as with sodium stearate so that sodium chloride is eliminated in the reaction. Glycerol dichlorhydrin can be employed and can be reacted with two moles of a carboxy acid or with one mole each of two different carboxy acids, or with their sodium salts in the manner previously described. If desired, glycerol chlorhydrin can be replaced by glycidol. Mono- or di-glycerides, for example, can be obtained by controlled hydrolysis from the ordinary naturally-occurring tri-glycerides. Mono- or di-glycerides can be obtained from various detergent-forming carboxy acids in the manner described in U. S. Patents Nos. 2,022,493 and 2,022,494, both dated November 26, 1935, to Christensen. Various other well known methods are available for the manufacture of the mono- or di-glycerides or equivalent bodies. For instance, one may react the acyl chloride with glycerol or the equivalent. Bromhydrins may be employed instead of chlorhydrins. It has been previously pointed out that after one has obtained the mono- or di-glyceride or the equivalent body, that the product can be subjected to sulfonation with a reagent, such as gaseous sulfur trioxide or chlorsulfonic acid, so as to produce the corresponding sulfoglycerol esters of the detergent-forming carboxy acids, and that one may even introduce two sulfo residues into an ester having two free polyhydric hydroxyls.

A polyhydric alcohol or polyhdric alcohol body such as glycerol or ethylene glycol, for example, can be treated with gaseous sulfur trioxide, or with chlorsulfonic acid to produce sulfurin, monosulfurin or di-sulfurin, or the equivalents. Such material can be reacted with the carboxylic acid in various forms, such as the acid itself, or an acyl chloride, or the salt, so as to obtain the sulfopolyhydric alcohol ester of the detergent-forming carboxy acid by the elimination of sulfuric acid, hydrochloric acid, water, or possibly an inorganic salt, such as sodium chloride. Di-sulfurin, for example, might be esterified with the acid, with the elimination of water. Similarly, di-sulfurin could be treated with the acyl chloride, so as to eliminate hydrochloric acid. Tri-sulfurin might be treated with the sodium salt of the acid so as to eliminate sodium hydrogen sulfate, or with the free acid so as to eliminate sulfuric acid. The various reactions previously referred to are illustrative of the various procedures employed in preparing these materials.

Other methods which may be employed are of the kind described in U. S. Patent No. 2,044,400, dated June 16, 1936, to Rheiner and Link.

The procedure which I prefer to employ is to obtain the mono-glyceride, for example, by any suitable procedure or process of the kind above outlined, and then subject the mono-glyceride to reaction with pyridinium sulfonic acid, or with aminosulfonic acid, so as to obtain the pyridine salt, or the ammonium salt of the sulfoglycerol ester of the selected carboxy acid. As to the employment of pyridinium sulfonic acids or aminosulfonic acids as sulfonating agents, see "Unit Processes in Organic Synthesis", Groggins, p. 238, (1935).

In the previous description, reference has been made to the use of gylcerol as an example of a polyhydric alcohol. It is evident, of course, that a large number of similar or related materials will serve just as effectivly, such as glycols, glycerol ethers, glycol ethers, etc. One may employ such materials as ethylene glycol, propylene glycol, amylene glycol, trimethylene glycol, etc. Such materials can be converted into chlorhydrins, and one can employ the chlorhydrins instead of the diols themselves. Similarly, glycerol can be converted into polyglycerol, such as di-glycerol, which is a glycerol ether. Di-glycerol ether, for example, can be employed as such, or can be converted into a suitable chlorhydrin and the chlorhydrin employed. What I have said in regard to ethers derived from glycerol applies with equal force and effect to glycol ethers, such as diethylene glycol ether and higher homologues. These materials may be employed as such, or after conversion into the chlorhydrins. It is known that in substantially all reactions where glycol chlorhydrins are employed, such as ethylene glycol chlorhydrin, that one can employ the corresponding alkylene oxide, such as ethylene oxide, propylene oxide, butylene oxide, amylene oxide, etc. It should be understood that these materials can be employed just as advantageously as the diols or the chlorhydrins derived from the diols, to produce a satisfactory demulsifying agent for my process. The expression "sulfopolyhydric alcohol ester of a detergent-forming carboxylic acid", as hereinafter employed, is intended to refer to an ester in which a residue derived from a diol or triol, or diol ether or triol ether, has been sulfated by the introduction of an HSO₄ radical in the place of at least one hydroxyl radical. The sulfuric hydrogen atom may be replaced by metallic atoms, organic radicals, etc. In other words, the expression includes residues from the ether alcohols, as well as the alcohols themselves. For that matter, as a chemical equivalent one could employ the material obtained by producing an ether from glycerol and a mono-hydric alcohol or similar materials, provided that the final product contained at least two alcoholiform hydroxyls, one of which could be combined with the detergent-forming carboxylic acid, and the other of which could be combined with sulfuric acid, as indicated.

It is understood that reference to a polyhydric alcohol, or a polyhydric alcohol residue, refers to the ether type, as well as the non-ether type. Whenever it is intended to limit the meaning to the polyhydric alcohols, as differentiated from the polyhydric alcohol ethers, the expression "free from an ether linkage" will be employed.

Although it has been pointed out that the detergent-forming carboxy acid may be supplied by a resin acid, such as abietic acid, chlorabietic acid, sulfoabietic acid, or the like, or may be furnished by a petroleum carboxy acid, such as naphthenic acid, sulfonaphthenic acid, or the like, I prefer to employ detergent-forming carboxy acids derived from fatty acids, and particularly, modified fatty acids, which are nothing more nor less than equivalent functional derivatives of a simple unchanged fatty acid, and which still have the characteristic quality of combining with an alkali to give a soap or soap-like detergent. These acids are commonly referred to as "modified fatty acids." I prefer to prepare my demulsifying agent, which is a sulfopolyhydric alcohol ester, from modified fatty acids.

The expression "modified fatty acids" is well understood by those skilled in the art of resolving petroleum emulsions of the water-in-oil type, and has been used frequently in the patent literature to designate a certain well known class of materials. Briefly described, modified fatty acids are modifications of fatty acids obtained by chemical reaction on a fatty acid or its equivalent, so as to result in an addition product or substitution product, and they bear a simple genetic relationship to each other or to the parent fatty acid or fatty acid compound from which they were derived. Modified fatty acids do not include salts of unmodified fatty acids, such as soaps, because a salt of a fatty acid is not an addition product. Likewise, it is not a substitution product, because "substitution products" in the sense that such term is used in organic chemistry, is applied not to salts, but to undissociable or indifferent compounds. Furthermore, whereas the acid hydrogen involved in salt formation can be replaced only by metals or metal-like groups, that is, elements or radicals which are electro-positive, substitution may replace the hydrogen of organic compounds by a variety of elements and groups which may be electro-negative.

The treating agent or reagent contemplated by my process includes esters of the specific kind described, and may be derived from either simple fatty acids, or modified fatty acids. In order to keep the distinction clear between a simple fatty acid and a modified fatty acid and yet use a term which will be inclusive of both classes, the expression "fatty acid" will be used hereafter to indicate both classes of materials. A simple fatty acid is indicated by the formula R.COOH, in which R is a fatty acid radical, such as an oleic acid radical, stearic acid radical, palmitic acid radical, ricinoleic acid radical, and COOH indicates the conventional carboxyl radical. If the simple fatty acid is of the unsaturated type, such as oleic acid, ricinoleic acid, etc., and one produces an addition product by means of a chemical reagent, then the modified fatty acid thus obtained may be indicated by the formula R.XX.COOH, in which XX represents atoms or radicals joined in addition, such as OH, HSO4, HSO3, Cl, Br, C6H4HSO3, C6H3OH.HSO3, etc. XX may represent the same atoms as in the case of oleic acid dichloride, or XX may represent an atom and a radical, as in the case of oleic acid hydrogen hydrogen sulfate. In event that the simple fatty acid contained more than one ethylene linkage, such as linoleic acid, then one might obtain a modified fatty acid of the type R.XX.XX.COOH, but which is simply considered as a variety of the R.XX.COOH specie.

Just as the simple fatty acid of the type R.COOH may yield addition products, likewise, it may yield substitution products, and such a modified fatty acid may be designated by the formula R'D.COOH, in which R' is a simple fatty acid radical residue, D is the substituent atom or radical, such as HSO4, HSO3, C6H4HSO3, phthalic acid residue, oxalic acid residue, acetic acid residue, phosphoric acid residue, chlorine, etc., or a residue of the type R".COO, in which R" indicates another simple or modified fatty acid radical residue which may be different, or it may be the same as R', as in the case of poly acids, such as diricinoleic, triricinoleic, etc., COO is a carboxyl residue.

Simple fatty acids, such as ricinoleic acid, may yield a modified fatty acid which is both an addition and substitution product. For instance, ricinoleic acid may yield a modified fatty acid, which is both an addition and a substitution product, and may be indicated by the formula R'D.XX.COOH, in which the various symbols have the same significance, as previously. The formula R.COOH includes fatty acids, such as oleic acid, ricinoleic acid, stearic acid, etc.

The formulas R.XX.COOH, R'D.COOH, and R'D.XX.COOH include the conventional modified fatty acids. Fatty acids include the class comprising

R.COOH
R.XX.COOH
R'D.COOH
R'D.XX.COOH, in which the symbols have their previous significance. The above formulas indicate the simple genetic relationship existing among the members of the class. For sake of simplicity, hereafter in the class R.COOH will be used to designate either the simple or modified fatty acids, without distinction, except when the context denote a specific meaning.

The treating agent or reagent, which I prefer to employ in my present process, is the sulfoglycerol ester of a sulfoaromatic fatty acid. It is prepared in the following manner: An unsaturated fatty acid, such as ricinoleic acid, or oleic acid, or the corresponding glycerides, such as castor oil, or olive oil, are mixed with a molecular weight of phenol and treated with a large excess of concentrated sulfuric acid at a temperature of about 35° C. This is the conventional process for preparation of sulfoaromatic fatty acids, so-called aromatic fatty sulfonic acids, and commonly referred to as Twitchell reagents. The sulfonation mass is washed thoroughly so as to remove uncombined sulfuric acid and phenol sulfonic acid. The separated layer is boiled so as to decompose any fatty sulfates. The material is then dissolved in water and extracted with ether so as to remove any unsulfonated fatty material. The final product is concentrated so as to give sulfophenol stearic acid or the equivalent acid from castor oil, for example. This product is then converted into the dibasic sodium salt by neutralization with strong caustic soda and then dried so as to give the anhydrous product. The anhydrous product is powdered and mixed with a molecular quantity of glycerol chlorhydrin and reacted with constant stirring, so that sodium chloride is precipitated by removing the sodium atom in the carboxylic hydrogen position. The product so obtained may be indicated by the following formula:

$C_{17}H_{33}.H.C_6H_3.OH.SO_3.Na.COO.C_3H_5(OH)_2$

The product is then reacted with one mole of pyridinium sulfonic acid to give a material of the following composition:

$C_{17}H_{33}.H.C_6H_3.OH.SO_3.Na.$
$COO.C_3H_5(OH).SO_4H.C_5H_5N$

This is the pyridinium hydrogen sulfate salt and is comparable, of course, to aniline hydrochloride, etc. Instead of employing pyridinium sulfonic acid, one may employ amino sulfonic acid and thus obtain the ammonium salt.

It is understood, of course, that it is immaterial whether reagents of the kind previously referred to be used in the acid state, or be used after neutralization or esterification. Neutralization or esterification may involve either a single acidic hydrogen or more than one acidic hydrogen where the compound happens to contain more than one acidic hydrogen, as in the preferred example previously described. In other words, an acidic hydrogen, whether in the carboxylic position, or the sulfonic hydrogen position, or in the acid sulfate position, may be combined with a suitable base, such as caustic soda, caustic potash, ammonium hydroxide, or with a suitable amine, such as pyridine, aniline, triethanolamine, amylamine, cyclohexylamine, benzylamine, and the like. The material may be combined with such materials as calcium or magnesium oxide or a carbonate. The materials may be combined so as to produce heavy metal salts, such as the iron salts, copper salts, etc. Carboxylic hydrogens, if present, may be esterified with a mono-hydric alcohol, such as methyl alcohol, ethyl alcohol, propyl alcohol, etc., or may be esterified with a polyhydric alcohol, such as glycerol, ethylene glycol, and the like.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° C., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately one part of treating agent to 500 parts of emulsion, up to one part of treating agent to 20,000, or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsion, i. e., emulsions that will yield readily to the action of chemical demulsifying agents, the ratio of 1:30,000, above referred to, may be sufficient to produce highly satisfactory results. In general, I have found that for an average petroleum emulsion a ratio of 1 part of treating agent to 5,000 parts or 10,000 parts of emulsion will usually be found to produce commercially satisfactory results.

Having thus described my invention, what I claim as new and desire to secure by Letters Patent is:

1. A process for breaking petroleum emulsions of the water-in-oil type, which consists in subjecting the emulsion to the action of a demulsifying agent that is derived by replacing at least one polyhydric alcohol hydroxyl radical in a polyhydric alcohol ester of a detergent-forming carboxy acid by a combination of a sulfate radical and an ionizable hydrogen atom equivalent.

2. A process for breaking petroleum emulsions of the water-in-oil type, which consists in subjecting the emulsion to the action of a demulsifying agent of the kind indicated by the type formula:

in which R.COO is the carboxy acid radical derived from a detergent-forming carboxy acid; $T(OH)_n$ is the residue from a polyhydric alcohol; $SO_4$ is the sulfate radical; and Z is the ionizable hydrogen equivalent; $n$ represents the numeral 0, 1 or more; and $m$ represents the numeral 1 or more.

3. A process for breaking petroleum emulsions of the water-in-oil type, which consists in subjecting the emulsion to the action of a demulsifying agent of the kind indicated by the type formula:

$$R.COO.T(OH)_n(SO_4.Z)_m$$

in which R.COO is a detergent-forming carboxy acid derived from a petroleum acid; $T(OH)_n$ is the desidue from a polyhydric alcohol; $SO_4$ is the sulphate radical; Z is the ionizable hydrogen equivalent; $n$ represents the numeral 0, 1 or more; and $m$ represents the numeral 1 or more.

4. A process for breaking petroleum emulsions of the water-in-oil type, which consists in subjecting the emulsion to the action of a demulsifying agent of the kind indicated by the type formula:

$$R.COO.T(OH)_n(SO_4.Z)_m$$

in which R.COO is a detergent-forming carboxy acid derived from rosin; $T(OH)_n$ is the residue from a polyhydric alcohol; $SO_4$ is the sulfate radical; Z is the ionizable hydrogen equivalent; $n$ represents the numeral 0, 1 or more; and $m$ represents the numeral 1 or more.

5. A process for breaking petroleum emulsions of the water-in-oil type, which consists in subjecting the emulsion to the action of a demulsifying agent of the kind indicated by the type formula:

$$R.COO.T(OH)_n(SO_4.Z)_m$$

in which R.COO is a detergent-forming carboxy acid derived from a fatty acid; $T(OH)_n$ is the residue from a polyhydric alcohol; $SO_4$ is the sulfate radical; Z is the ionizable hydrogen equivalent; $n$ represents the numeral 0, 1 or more; and $m$ represents the numeral 1 or more.

6. A process for breaking petroleum emulsions of the water-in-oil type, which consists in subjecting the emulsion to the action of a demulsifying agent of the kind indicated by the type formula:

$$R.COO.T(OH)_n(SO_4.Z)_m$$

in which R.COO is a detergent-forming carboxy acid obtained from a modified fatty acid; $T(OH)_n$ is the residue from a polyhydric alcohol; $SO_4$ is the sulfate radical; Z is the ionizable hydrogen equivalent; $n$ represents the numeral 0, 1 or more; and $m$ represents the numeral 1 or more.

7. A process for breaking petroleum emulsions of the water-in-oil type, which consists in subjecting the emulsion to the action of a demulsifying agent of the kind indicated by the type formula:

$$R.COO.T(OH)_n(SO_4.Z)_m$$

in which R.COO is a detergent-forming carboxy acid selected from the class of modified fatty acids of the sulfo fatty acid type; $T(OH)_n$ is the residue from a polyhydric alcohol; $SO_4$ is the sulfate radical; Z is the ionizable hydrogen equivalent; $n$ represents the numeral 0, 1 or more; and $m$ represents the numeral 1 or more.

8. A process for breaking petroleum emulsions of the water-in-oil type, which consists in subjecting the emulsion to the action of a demulsifying agent of the kind indicated by the type formula:

$$R.COO.T(OH)_n(SO_4.Z)_m$$

in which R.COO is a detergent-forming carboxy acid selected from the class of modified fatty acids of the sulfo fatty acid type and more specifically of the sulfo-aromatic fatty acid type; $T(OH)_n$ is the residue from a polyhydric alcohol; $SO_4$ is the sulfate radical; Z is the ionizable hydrogen equivalent; $n$ represents the numeral 0, 1 or more; and $m$ represents the numeral 1 or more.

9. A process for breaking petroleum emulsions of the water-in-oil type, which consists in subjecting the emulsion to the action of a demulsifying agent of the kind indicated by the type formula:

$$R.COO.T(OH)_n(SO_4.Z)_m$$

in which R.COO is a detergent-forming carboxy acid selected from the class of modified fatty acids of the sulfo fatty acid type and more specifically of the sulfo-aromatic fatty acid type; $T(OH)_n$ is the residue from a polyhydric alcohol, and additionally characterized by being free from an ether linkage, $SO_4$ is the sulfate radical; Z is the ionizable hydrogen equivalent; $n$ represents the numeral 0, 1 or more; and $m$ represents the numeral 1 or more.

10. A process for breaking petroleum emulsions of the water-in-oil-type, which consists in subjecting the emulsion to the action of a demulsifying agent of the kind indicated by the type formula:

$$R.COO.T(OH)_n(SO_4.Z)_m$$

in which R.COO is a detergent-forming carboxy acid selected from the class of modified fatty acids of the sulfo fatty acid type and more specifically of the sulfo-aromatic fatty acid type; $T(OH)_n$ is a glycerol residue; $SO_4$ is the sulfate radical; Z is the ionizable hydrogen equivalent; $n$ represents the numeral 0, or 1; and $m$ represents the numeral 1 or 2.

11. A process for breaking petroleum emulsions of the water-in-oil type, which consists in subjecting the emulsion to the action of a demulsifying agent of the kind indicated by the type formula:

$$R.COO.T(OH)(SO_4.Z)$$

in which R.COO is a detergent-forming carboxy acid selected from the class of modified fatty acids of the sulfo fatty acid type and more specifically of the sulfoaromatic fatty acid type; $T(OH)$ is a glycerol residue; $SO_4$ is the sulfate radical; Z is the ionizable hydrogen equivalent.

12. A process for breaking petroleum emulsions of the water-in-oil type, which consists in subjecting the emulsion to the action of a demulsifying agent of the kind indicated by the type formula:

$$R.COO.T(OH)(SO_4.Z)$$

in which R.COO is a detergent-forming carboxy acid selected from the class of modified fatty acids of the sulfo fatty acid type and more specifically of the sulfophenol fatty acid type; $T(OH)$ is a glycerol residue; $SO_4$ is the sulfate radical; Z is the ionizable hydrogen equivalent.

13. A process for breaking petroleum emulsions of the water-in-oil type, which consists in subjecting the emulsion to the action of a demulsifying agent of the following type formula:

$$C_{17}H_{33}.H.C_6H_3.OH.SO_3.Na.$$
$$COO.C_3H_5(OH).SO_4H.C_5H_5N$$

14. A process for breaking petroleum emulsions of the water-in-oil type, which consists in subjecting the emulsion to the action of a demulsifying agent of the following type formula:

$$C_{17}H_{33}.H.C_6H_3.OH.SO_3.Na.$$
$$COO.C_3H_5(OH).SO_4H.C_5H_5N$$

admixed with a suitable solvent.

MELVIN DE GROOTE.